H. C. GATES.
CHOCOLATE COOLING MACHINE.
APPLICATION FILED JUNE 24, 1918.
1,375,380.
Patented Apr. 19, 1921.
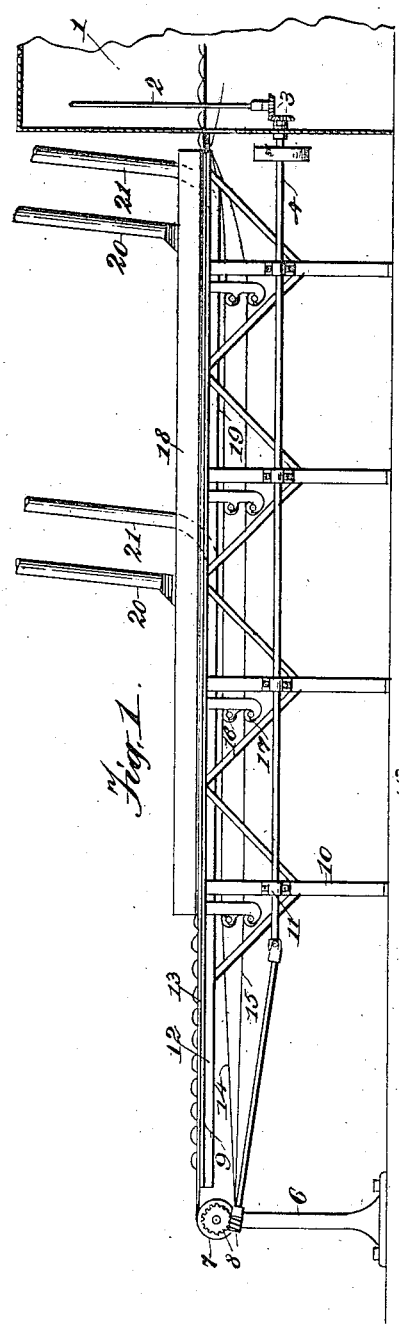
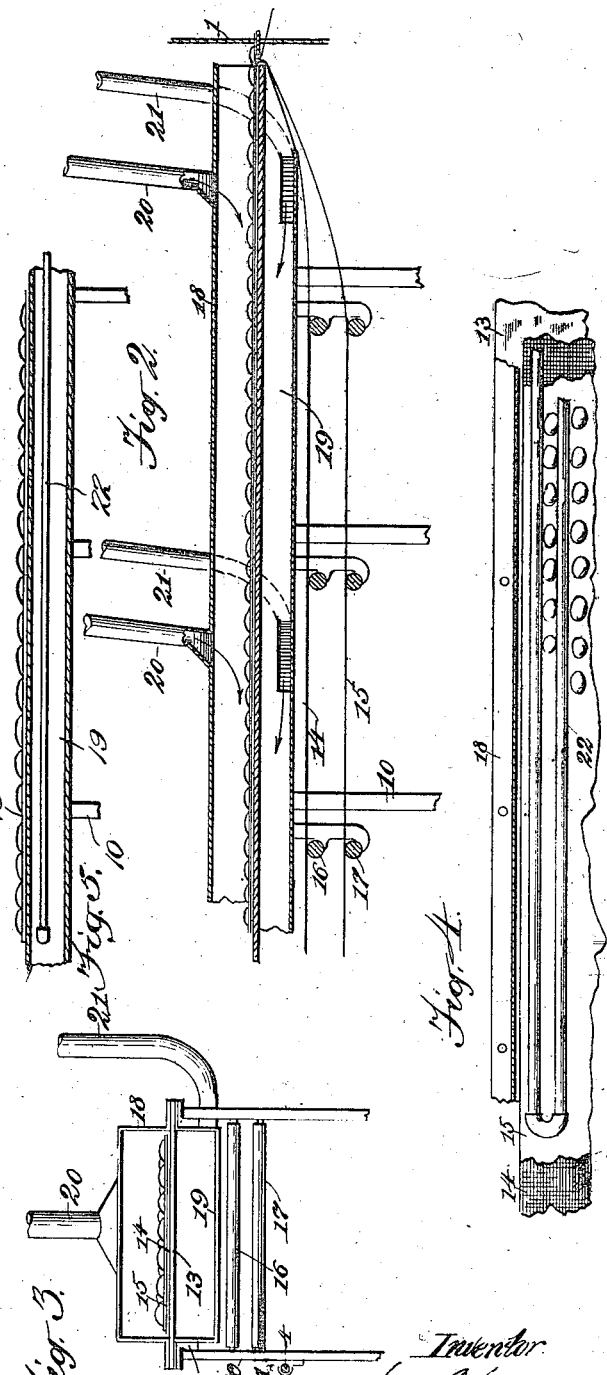
Inventor
Henry C. Gates
By J. M. St. John, Atty.

UNITED STATES PATENT OFFICE.

HENRY C. GATES, OF CEDAR RAPIDS, IOWA.

CHOCOLATE-COOLING MACHINE.

1,375,380.  Specification of Letters Patent.  Patented Apr. 19, 1921.

Application filed June 24, 1918. Serial No. 241,688.

*To all whom it may concern:*

Be it known that I, HENRY C. GATES, a citizen of the United States, residing at Cedar Rapids, in the county of Linn and State of Iowa, have invented certain new and useful Improvements in Chocolate-Cooling Machines; and I do hereby declare the following to be a full, clear, and exact description of the invention, such as will enable others skilled in the art to which it appertains to make and use the same.

This invention relates to the manufacture of chocolate candy, and has for its object to provide means for transferring such candy from the coating machine to a place where it may be collected for packing, and in the course of such transfer may be thoroughly cooled and finished, having a smooth, glazed surface top and bottom, and of such a consistency as to admit of easy handling, without abrasion, or any tendency to stickiness.

The nature of the invention is fully disclosed in the description and claims following, reference being had to the accompanying drawing, in which:

Figure 1 is a side elevation of a machine embodying my invention. Fig. 2 is a central, longitudinal section of a part of the same. Fig. 3 is an end view, as seen from the right, near the coating machine. Fig. 4 is a fragmentary plan view, partly in section, showing a modification in the cooling means. Fig. 5 is a fragmentary view in vertical section, illustrating the cooling device shown in Fig. 4 as applied to the lower tunnel, and with the upper tunnel removed.

In the drawing, the numeral 1 denotes an automatic coating machine for applying chocolate to candy, and which forms no part of this invention. Its driving shaft 2 is, however, shown geared at 3 to a shaft 4 of this invention. A part of the candy-carrying belt of the coating machine is also shown, its outer loop extending close to a similar loop in the conveyer apron of this invention, whereby the coated product of the machine is passed to said conveyer apron. In order that they may run closely together both the carrying belt and the conveyer apron run over thin, stationary parts here, instead of rollers.

At a considerable distance from the coating machine is set a floor-stand 6, on which is mounted a drum 7 driven by the shaft 4 through the medium of worm-gears 8, or the like.

Between this floor-stand and the coating machine is placed a long table 9 having supporting legs 10 carrying the drive-shaft in bearings 11. To side-rails 12 is attached the table-top 13, which in practice is a sheet of comparatively thin metal, such as galvanized steel. This serves as the support for the upper portion of the conveyer apron moved by the terminal drum above described. In practice the apron is composed of two parts. The part 14 next to the drum, is of webbing, or the like, suitable for wear and service, and outside of this is a continuous sheet of material 15 adapted to receive the coated candy and permit it to flake off easily when dry and fully cooled. In practice a specially treated paper serves very well, but a more durable, and highly satisfactory material is oil-cloth, to which the coated candy does not stick, and which last indefinitely. These aprons are preferably separated throughout the lower half of their course, being carried over rollers 16 and 17.

Throughout the greater part of its length the table is inclosed above and below by air-conductors or tunnels 18 and 19. These are supplied with cold air by pipes 20 and 21, respectively, which are supposed to connect with an air-trunk of the cooling system (not shown) with which the chocolate room is usually supplied. A continuous current of cold air is thus blown over the candy lying on the carrier apron, which passes through the upper tunnel. This serves to thoroughly cool all of the exposed portions of the chocolate. At the same time a current of cold air is blown against the under side of the thin metal table, and this so chills it and the adjacent apron that the bottoms of the chocolate drops are similarly cooled. When the candy finally emerges from the delivery ends of the tunnel it is dry, cool, and beautifully glossy, and this applies to the bottoms of the chocolate drops as well as their tops. In this perfectly finished condition it is very easy for operators to sweep the chocolate off the apron and pass it on to the packers.

In practice I regard the cooling agent and means illustrated in Figs. 1, 2 and 3 as the best for the purpose. In Fig. 4, however, a refrigerating coil 22 is shown as placed in the tunnel over the conveyer apron, and obviously the same might be placed below the table as well. Cold air in movement is preferred, however, as its action is to dry as well as cool the chocolates.

It will be understood that the use of a single tunnel, either above or below, will operate very beneficially, more especially below the conveyer apron, since this chills and glazes the bottoms of the chocolates, and allows them to slip easily from the conveyer apron without wear or waste. The construction in this last case is as illustrated, and involves only the removal of the upper tunnel, or the construction of the apparatus without such tunnel.

Having thus described my invention, I claim:

1. Delivery apparatus for chocolate-coating machines, comprising a straight-away endless apron to receive the candies as coated and carry them from the coating machine, a supporting table therefor, means for imparting motion to the apron, an air-tunnel below said table, open only at its ends, and air-conduits leading thereto from a source of moving cold air.

2. Delivery apparatus for chocolate-coating machines, comprising a straight-away endless apron to receive the candies as coated and carry them away from the coating machine, means for moving said apron, a supporting table therefor, air-tunnels above and below said apron and table, open only at its ends, and air-conduits leading to said tunnels from a source of moving cold air.

3. Delivery apparatus for chocolate-coating machines, comprising an endless apron to receive the candies as coated and to carry them from the coating machine, a supporting and carrying apron therefor, a support for the double apron, an air-tunnel inclosing the same through the larger part of its outward travel from the coating machine, and cold-air conduits connecting with said tunnel.

4. Delivery apparatus for chocolate-coating machines, comprising a double, endless apron, the outer, candy-carrying sheet being of oil-cloth, means to support and move said aprons, an air-tunnel inclosing the same through a part of its outward travel from the coating machine, and cold-air conduits leading thereto from a source of moving cold air.

In testimony whereof I affix my signature in presence of two witnesses.

HENRY C. GATES.

Witnesses:
CHARLES G. VAVRA,
J. M. ST. JOHN.